(12) United States Patent
Nakasha et al.

(10) Patent No.: US 9,184,789 B2
(45) Date of Patent: Nov. 10, 2015

(54) COMMUNICATION APPARATUS

(75) Inventors: Yasuhiro Nakasha, Hadano (JP); Hiroki Hayashi, Yokohama (JP); Takumi Itoh, Sakura (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/559,883

(22) Filed: Jul. 27, 2012

(65) Prior Publication Data

US 2013/0034131 A1 Feb. 7, 2013

(30) Foreign Application Priority Data

Aug. 1, 2011 (JP) .................................. 2011-168641

(51) Int. Cl.
*H04B 1/717* (2011.01)
*H04B 10/2513* (2013.01)
*H04B 1/719* (2011.01)
*H04L 25/03* (2006.01)
*H04L 25/49* (2006.01)

(52) U.S. Cl.
CPC .............. *H04B 1/7174* (2013.01); *H04B 1/719* (2013.01); *H04B 10/25137* (2013.01); *H04L 25/03834* (2013.01); *H04L 25/4904* (2013.01); *H04L 25/4915* (2013.01)

(58) Field of Classification Search
CPC ............... H04B 1/7174; H04B 1/7172; H04B 1/71632; H04B 1/7163; H04B 1/04; H04B 2210/006; H04B 10/25137
See application file for complete search history.

(56) References Cited

U.S. PATENT DOCUMENTS

| 4,419,757 | A | * | 12/1983 | De Gennaro et al. | 375/286 |
| 4,504,944 | A | * | 3/1985 | Johannes | 370/540 |
| 4,939,785 | A | * | 7/1990 | Murata et al. | 455/561 |
| 5,583,850 | A | * | 12/1996 | Snodgrass et al. | 370/342 |
| 6,020,765 | A | * | 2/2000 | Drost et al. | 327/42 |
| 6,218,842 | B1 | * | 4/2001 | Bittar et al. | 324/339 |
| 8,054,908 | B2 | | 11/2011 | Nakasha et al. | |
| 2002/0101640 | A1 | * | 8/2002 | Snawerdt | 359/183 |
| 2002/0101981 | A1 | * | 8/2002 | Sugiyama | 379/406.01 |
| 2005/0009557 | A1 | * | 1/2005 | Watanabe et al. | 455/550.1 |
| 2005/0169352 | A1 | * | 8/2005 | Perdue | 375/147 |
| 2005/0254553 | A1 | * | 11/2005 | Yao et al. | 375/130 |

(Continued)

FOREIGN PATENT DOCUMENTS

| JP | 3-27622 | 2/1991 |
| JP | 2006-157649 A1 | 6/2006 |
| JP | 2006303704 | 11/2006 |
| JP | 2008533754 | 8/2008 |
| JP | 2008205733 | 9/2008 |
| WO | WO 2006/098163 | 9/2006 |

OTHER PUBLICATIONS

Roy, Howard. Principles of Randomm Signal Analysis and Low Noise Design: The Power Spectral Desnity and its Applications published on Aug. 2004, p. 116, IEEE Press.*

(Continued)

*Primary Examiner* — Chieh M Fan
*Assistant Examiner* — Sarah Hassan
(74) *Attorney, Agent, or Firm* — Kratz, Quintos & Hanson, LLP

(57) ABSTRACT

A communication apparatus includes: a pulse generation unit configured to alternately generate a positive pulse and a negative pulse indicating presence or absence of a pulse in accordance with a value of a data signal; a band-pass filter configured to filter the pulse generated by the pulse generator; and a transmission amplifier configured to amplify a signal filtered by the band-pass filter, and to output the signal as a transmission signal.

10 Claims, 7 Drawing Sheets

(56) References Cited

U.S. PATENT DOCUMENTS

| | | | |
|---|---|---|---|
| 2006/0066485 A1* | 3/2006 | Min | 342/465 |
| 2006/0114034 A1 | 6/2006 | Kawano | |
| 2008/0198939 A1 | 8/2008 | Nakasha et al. | |
| 2009/0049324 A1* | 2/2009 | Best | 713/400 |
| 2011/0141829 A1* | 6/2011 | Ware | 365/189.09 |
| 2012/0140809 A1* | 6/2012 | Krause et al. | 375/224 |

OTHER PUBLICATIONS

Extended European Search Report mailed Oct. 29, 2012 in counterpart application No. 121779383.3-2411.

Japanese Office Action dated Jan. 20, 2015 in counterpart Japanese Patent Application No. 2011-168641 (with partial English translation).

* cited by examiner

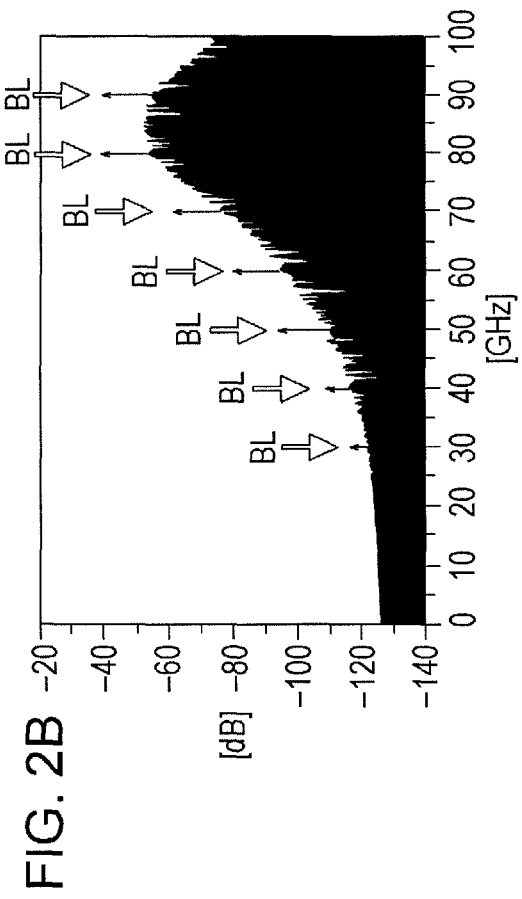
FIG. 2B
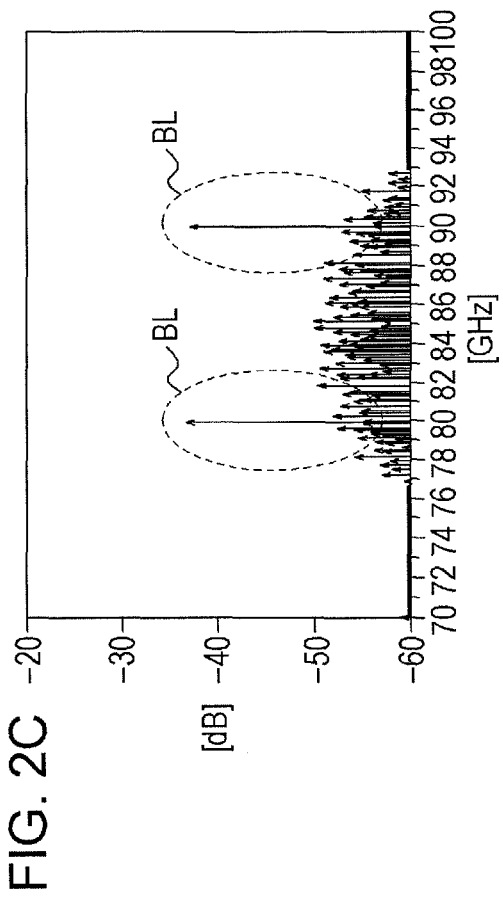
FIG. 2C
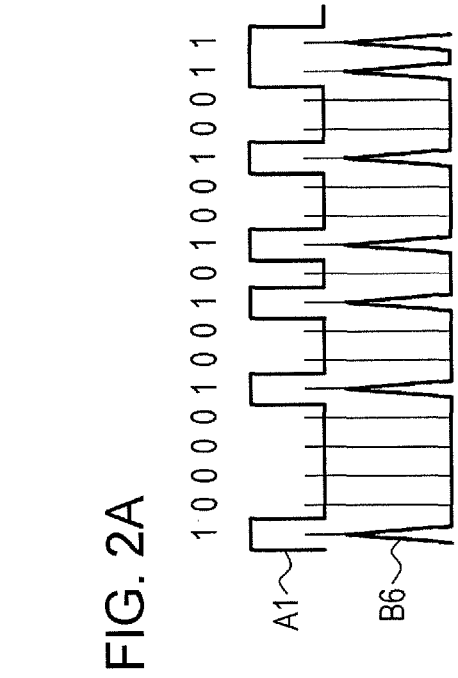
FIG. 2A
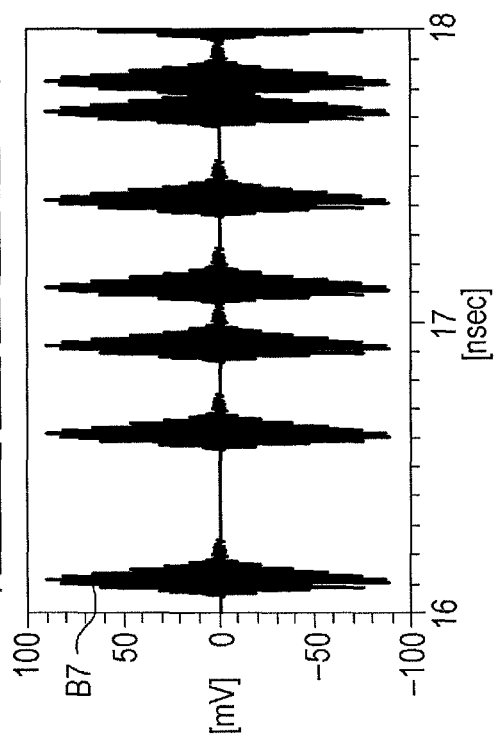

COMMUNICATION APPARATUS

CROSS-REFERENCE TO RELATED APPLICATION(S)

This application is based upon and claims the benefit of priority of the prior Japanese Patent Application No. 2011-168641, filed on Aug. 1, 2011, the entire contents of which are incorporated herein by reference.

FIELD

The embodiments discussed herein are related to a communication apparatus.

BACKGROUND

Impulse radio communication is radio communication using a short pulse, and is expected to be applied to broadband radio communication systems.

Also, a U/B conversion circuit, which is a U/B conversion circuit that converts a unipolar signal into a bipolar signal, and when a signal produced by performing NRZ/RZ conversion on an input NRZ signal is given, a bipolar signal produced by converting an NRZ signal is obtained as an emitter output of a transistor, is known.

Also, a pulse-polarity modulation circuit in which pairs of differential transistors are stacked in two-stages, and a unipolar pulse is converted into a bipolar pulse in accordance with a value of the input data, is known.

[Patent Document] Japanese Laid-open Patent Publication No. 3-27622

[Patent Document] Japanese Laid-open Patent Publication No. 2006-157649

SUMMARY

According to an aspect of the embodiments, a communication apparatus includes: a pulse generation unit configured to alternately generate a positive pulse and a negative pulse indicating presence or absence of a pulse in accordance with a value of a data signal; a band-pass filter configured to filter the pulse generated by the pulse generator; and a transmission amplifier configured to amplify a signal filtered by the band-pass filter, and to output the signal as a transmission signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A to 2C are diagrams illustrating examples in which a short-pulse generation unit generates a unipolar short pulse;

DESCRIPTION OF EMBODIMENT

Figure 1A:
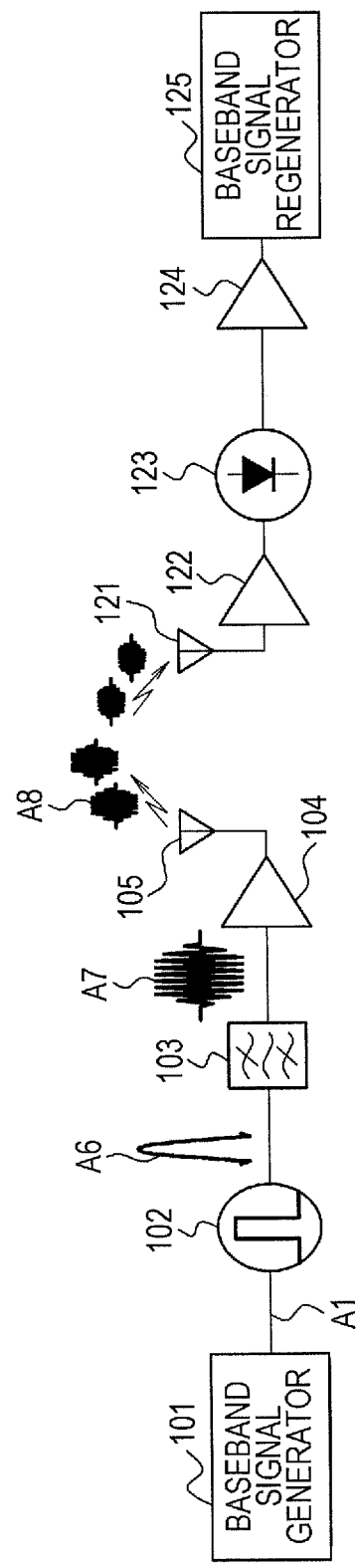
FIG. 1A is a diagram illustrating an example of a configuration of an impulse radio communication apparatus according to an embodiment.
Figure 1B:
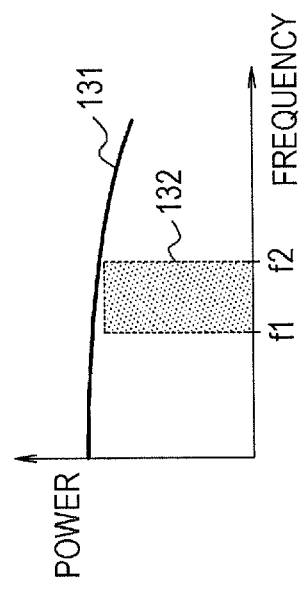
FIG. 1B is a diagram illustrating a pass frequency band of a band-pass filter.

FIG. 1A is a diagram illustrating an example of a configuration of an impulse radio communication apparatus according to an embodiment, and FIG. 1B is a diagram illustrating a pass frequency band of a band-pass filter 103. The impulse radio communication apparatus includes a baseband signal generator 101, a short-pulse generation unit 102, a band-pass filter 103, a transmission amplifier 104, a first antenna 105, a second antenna 121, a reception amplifier 122, a wave detector 123, a limit amplifier 124, and a baseband signal regenerator 125. The baseband signal generator 101, the short-pulse generation unit 102, the band-pass filter 103, the transmission amplifier 104, and the first antenna 105 constitute a transmission unit. On the other hand, the second antenna 121, the reception amplifier 122, the wave detector 123, the limit amplifier 124 and the baseband signal regenerator 125 constitute a reception unit.

Figure 7:
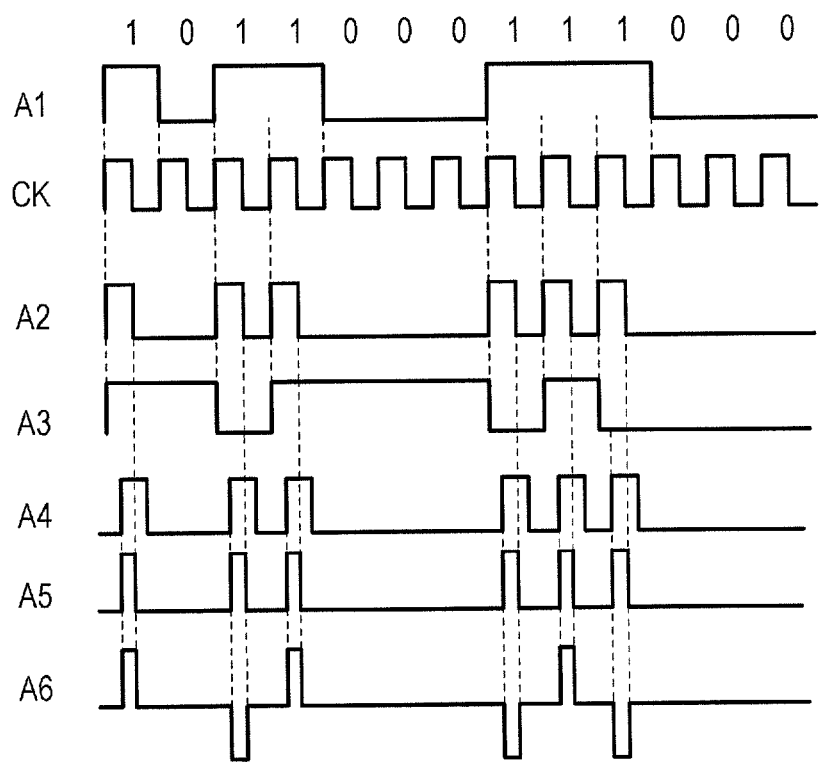
FIG. 7 is a timing chart for describing an example of operation of the short-pulse generation unit.

First, a description will be given of the transmission unit. The baseband signal generator 101 generates data signal A1 for each time slot, and outputs the signal to the short-pulse generation unit 102. As illustrated in FIG. 7, the data signal A1 becomes a high level at the time of a value "1", and becomes a low level at the time of a value "0". A communication speed of the data signal A1 is, for example, 10 gigabits/second (Gbps). The short pulse generation unit 102 generates a short pulse A6 when the data signal A1 becomes the high level in a time slot. The band-pass filter 103 performs filtering on the short pulse A6 in order to pass only a predetermined pass frequency band, and outputs a millimeter-wave pulse A7.

FIG. 1B illustrates a pass frequency band 132 of a band-pass filter 103. A short pulse characteristic 131 illustrates a frequency characteristic of the short pulse A6. The millimeter-wave pulse A7 has only frequency components of a part of the pass frequency band 132 among the short pulse characteristic 131. In UWB (Ultra Wide Band), etc., an available frequency band is limited. In order to satisfy a limitation of the frequency band, the band-pass filter 103 is used. The pass frequency band 132 has, for example, a lower-limit pass frequency f1 of 80 GHz, and an upper-limit pass frequency f2 of 90 GHz, and thus the pass frequency band width is f2−f1=90−80=10 GHz.

The transmission amplifier 104 amplifies the millimeter-wave pulse A7, and radio-transmits a transmission signal A8 through the first antenna 105. The transmission signal A8 represents data of "1" or "0" depending on presence or absence of the millimeter-wave pulse.

Next, a description will be given of the reception unit. The reception amplifier 122 radio-receives a reception signal through the second antenna 121, and amplifies the reception signal. The wave detector 123 detects an envelope of the reception signal (millimeter-wave pulse) amplified by the reception amplifier 122, and outputs the signal. The limit amplifier 124 amplifies the signal detected by the wave detector 123. The baseband signal regenerator 125 receives input of the signal amplified by the limit amplifier 124, and reproduces receive data of 10 Gbps, for example.

A radio communication apparatus of an impulse system may be used for a ultra-wideband radio communication apparatus, such as a microwave band, a quasi-millimeter wave band, and a UWB. The impulse system has a feature in which oscillators and mixers are not demanded, and thus a configuration of an RF unit becomes simple and low cost compared with a narrowband communication system. Accordingly, it is expected that broadband radio communication systems that perform broadband radio communication exceeding 10 Gbps are achieved in a millimeter wave band capable of using a broadband.

If it is assumed that a frequency band width assigned to an impulse radio communication apparatus is Bmax, if a pass frequency band width Bbpf of the band-pass filter 103 is equal to Bmax, the maximum communication speed Bmax is obtained. For example, if the frequency band width Bmax is 10 GHz, as illustrated in FIG. 1B, the pass frequency band width Bbpf of the band-pass filter 103 is f2−f1=90−80=10 GHz, and the communication speed of the data signal is 10 Gbps.

FIG. 2A is a diagram illustrating an example in which the short-pulse generation unit 102 generates a unipolar short pulse B6. The short pulse generator 102 generates a positive short pulse in a time slot in which the data signal A1 is a high level, and does not generate a positive short pulse in a time slot in which the data signal A1 is a low level, thereby outputting the unipolar short pulse B6. The unipolar short pulse B6 is a unipolar (for example, positive) short pulse. The band-pass filter 103 filters the unipolar short pulse B6, and outputs a millimeter-wave pulse B7. For example, the millimeter-wave pulse B7 has a communication speed of 10 Gbps, and the time slot thereof is 100 ps.

FIG. 2B is a diagram illustrating a frequency spectrum of the millimeter-wave pulse B7 in FIG. 2A. FIG. 2C is an enlarged diagram of a part of FIG. 2B. If the communication speed of the millimeter-wave pulse B7 is 10 Gbps, bright line spectra BL occur at intervals of 10 GHz. The bright line spectrum BL is a linear large power spectrum, and for example, occurs at 30, 40, 50, 60, 70, 80, 90 GHz, etc. The bright line spectra BL appear at frequency intervals equal to the communication speed. For example, when the communication speed is 10 Gbps, the bright line spectra BL appear at intervals of 10 GHz.

Incidentally, for many radio communication apparatuses, a signal intensity for each unit frequency (power spectrum density) is defined by law or by standards, etc., such as a signal intensity 0 dBm for each 1 MHz frequency (=1 mW/MHz), for example. If a transmission signal includes a bright line spectrum BL, a signal intensity of the bright line spectrum BL infringes a limitation of the above-described power spectrum density, thereby resulting in a situation in which average power is not allowed to be increased in all frequency bands. Specifically, when the allocated frequency band Bmax is 10 GHz (=10000 MHz), if a transmission spectrum intensity is fixed in a frequency band, it becomes possible to output 1 (mW/MHz)×10000 (MHz)=10 W. However, if a bright line spectrum BL of 1 mW/MHz is included in the transmission signal, only small power may be output. In order to perform long distance transmission without a signal error, it is demanded to maximize a spectrum power for all the frequency bands, and to ensure a signal intensity margin against noise, etc., (SN ratio). If the transmission power is restricted because of a bright line spectrum BL, it is difficult to sufficiently ensure the SN ratio. In this manner, the transmission power is restricted by a bright line spectrum BL, and long-distance and high-quality communication becomes disadvantageous, and thus it is a task to achieve an impulse radio communication apparatus that does not produce a bright line spectrum BL. In the following, a description will be given of an embodiment of an impulse-radio communication apparatus that produces a transmission signal not including a bright line spectrum BL, and that is suitable for long-distance and high-quality communications.

Figure 3:
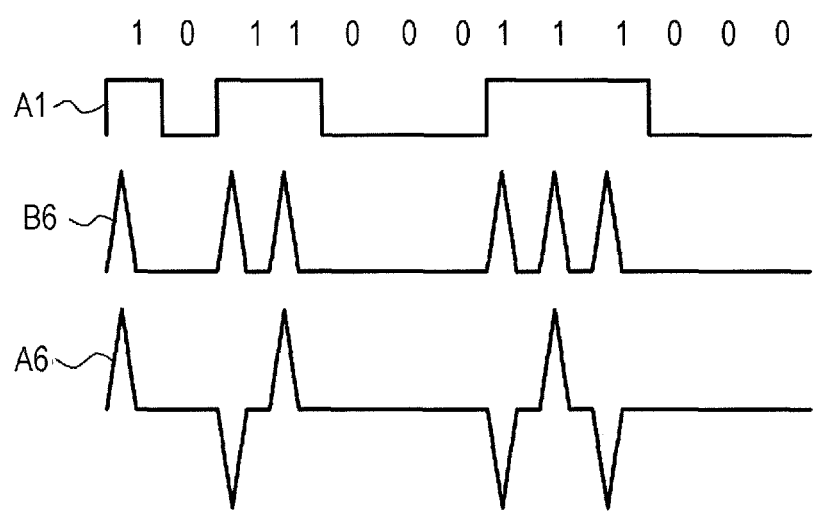
FIG. 3 is a diagram illustrating examples of a unipolar short pulse and a bipolar short pulse.

FIG. 3 is a diagram illustrating examples of a unipolar short pulse B6 and the bipolar short pulse A6. The unipolar short pulse B6 is the same as the unipolar short pulse B6 in FIG. 2A. In the present embodiment, the short-pulse generation unit 102 receives input of the data signal A1, and generates the bipolar short pulse A6. The bipolar short pulse A6 represents presence and absence of a pulse in accordance with a value of the data signal A1, and is a pulse that alternately generates a positive pulse and a negative pulse. For example, when the value of the data signal A1 is "1", a positive pulse or a negative pulse is generated as the bipolar short pulse A6, and when the value of the data signal A1 is "0", the bipolar short pulse A6 becomes a reference voltage. The positive pulse is a positive-voltage pulse with respect to the reference voltage, and the negative pulse is a negative-voltage pulse with respect to the reference voltage. That is to say, the bipolar short pulse A6 becomes a pulse having reverse polarity to an immediately preceding pulse.

The bipolar short pulse A6 has only an inverted phase of a high frequency component with respect to the unipolar short pulse B6, and has a same envelope of the signal. The wave detector 123 in FIG. 1A detects the envelope of the reception signal. Accordingly, the reception unit of the impulse radio communication apparatus in FIG. 1A may have the same configuration in the case of receiving the unipolar short pulse B6 or in the case of receiving the bipolar short pulse A6.

Figure 4A:
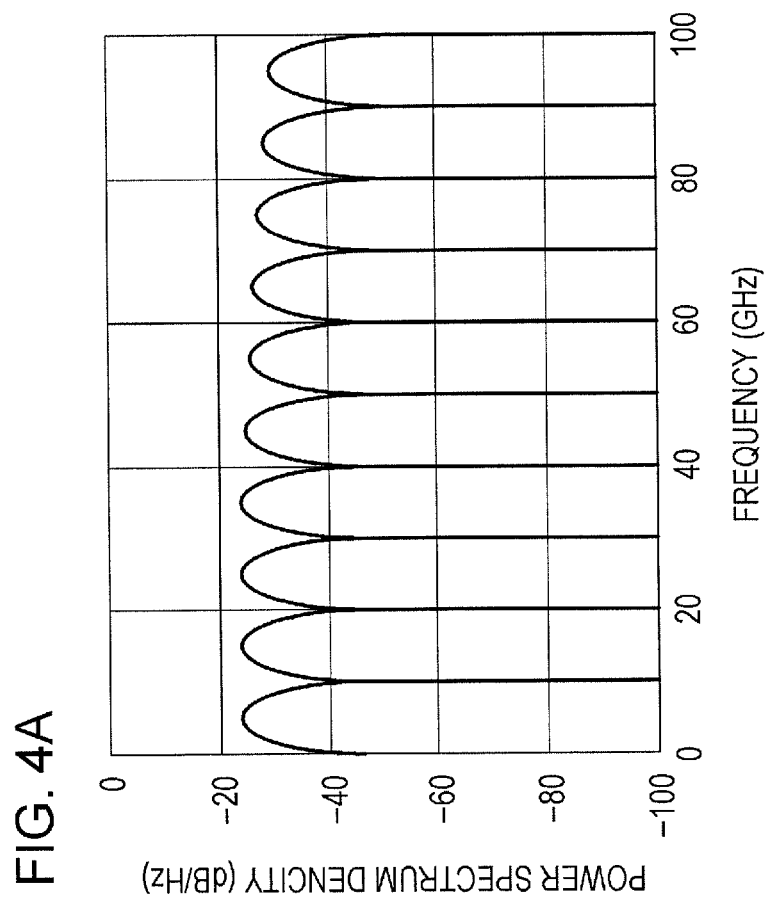
FIGS. 4A to 4C are diagrams illustrating power spectrum densities of a unipolar short pulse and a bipolar short pulse.

FIG. 4A is a diagram illustrating a power spectrum density of the bipolar short pulse A6. Here, the communication speed of the transmission signal is 10 Gbps, and the time slot of the transmission signal is 100 ps. In the power spectrum density of the bipolar short pulse A6, notches arise at frequencies equal to integer multiples of the communication speed (10 Gbps). That is to say, assuming that k is an integer, notches arise at frequencies of k×10 GHz. The notch is a concave part that has a low power spectrum density.

Figure 4B:
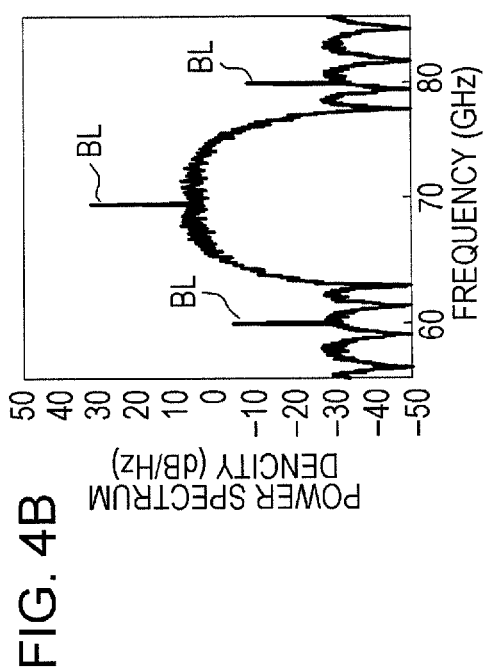

FIG. 4B is a diagram illustrating a power spectrum density of the output signal of the band-pass filter 103 that has received input of the unipolar short pulse B6. In the case of the unipolar short pulse B6, bright line spectra BL occur at frequencies equal to integer multiples of the communication speed (10 Gbps) in the same manner as FIG. 2B and FIG. 2C. For example, bright line spectra BL occur at 60 GHz, 70 GHz and 80 GHz.

Figure 4C:
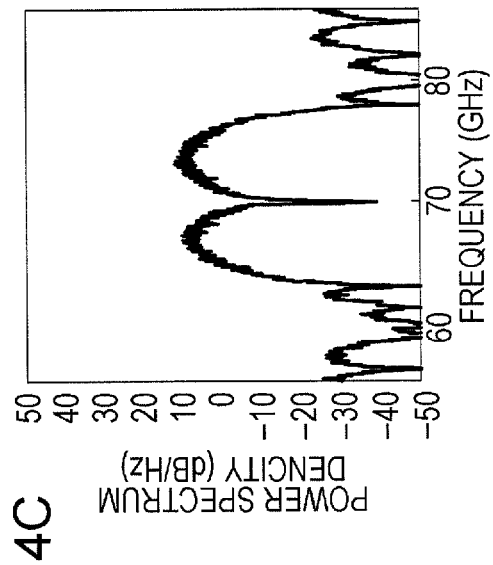

FIG. 4C is a diagram illustrating a power spectrum density of the output signal A7 of the band-pass filter 103 that has received input of the bipolar short pulse A6. In the case of the bipolar short pulse A6, in the same manner as FIG. 4A, notches arise at frequencies equal to integer multiples of the communication speed (10 Gbps). For example, notches occur at 60 GHz, 70 GHz and 80 GHz. As a result, bright line spectra BL having frequencies equal to integer multiples of the communication speed (10 Gbps) are removed. In the present embodiment, bright line spectra BL will not arise, and thus it becomes easy to ensure transmission power, and thus it becomes advantageous to perform long-distance and high-quality communication. Further, by setting a suitable communication speed for an allocated frequency band, it is possible to dispose notches at both ends f1 and f2 of the pass frequency band of the band-pass filter 103. Accordingly, it becomes advantageous to suppress irradiation of unwanted radio waves outside the allocated frequency band.

The transmission speed of the data signal is set to integer divisions of a difference between the upper-limit pass frequency f2 of the band-pass filter 103 and the lower-limit pass frequency f1. For example, the upper limit frequency f2 is 90 GHz, and the lower limit frequency f1 is 80 GHz. The pass frequency bandwidth of the band-pass filter 103 is f2−f1=90−80=10 GHz. In this case, the transmission speed of the data signal is set to integer divisions of 10 GHz. For example, the transmission speed of the data signal may be set to 10 Gbps, 5 Gbps, 2 Gbps or 1 Gbps, etc. In this manner, by setting a transmission speed, notches may be disposed at both of the ends f1 and f2 of the pass frequency band of the band-pass filter 103. Accordingly, it is possible to suppress irradiation of unwanted radio waves outside the allocated frequency band. In this regard, as the transmission speed is decreased, a frequency interval of notches becomes short, and the number of notches increases.

Figure 5:
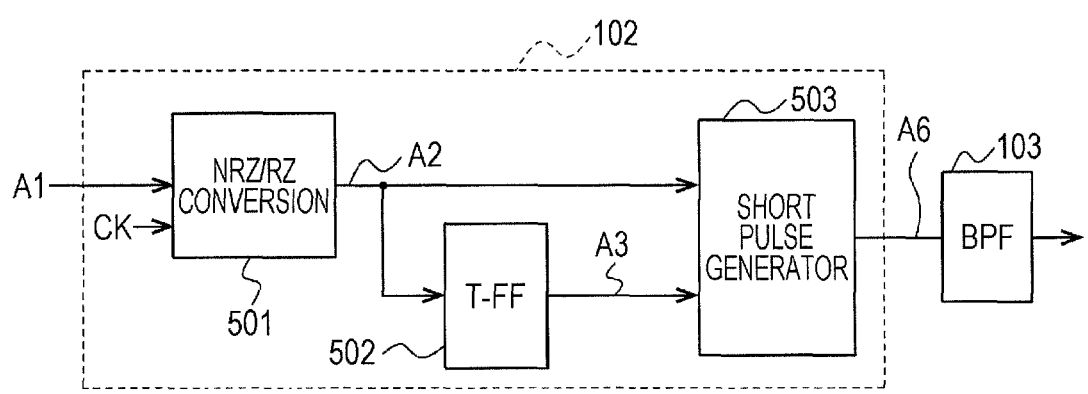
FIG. 5 is a diagram illustrating an example of a configuration of the short-pulse generation unit in the FIG. 1A.

FIG. 5 is a diagram illustrating an example of a configuration of the short-pulse generation unit 102 in the FIG. 1A, and FIG. 7 is a timing chart for explaining an example of operation of the short-pulse generation unit 102. The short-pulse generation unit 102 includes a nonreturn-to-zero (NRZ)/return-to-zero (RZ) conversion unit 501, a trigger flip-flop (T-FF) 502, and a short pulse generator 503. The data signal A1 is a nonreturn-to-zero signal. The nonreturn-to-zero (NRZ)/return-to-zero (RZ) conversion unit 501 converts the nonreturn-to-zero signal A1 into a return-to-zero signal A2. Specifically, the nonreturn-to-zero (NRZ)/return-to-zero (RZ) conversion unit 501 is a logical product (AND) circuit, calculates a logical product of the nonreturn-to-zero signal A1 and the clock signal CK, and outputs the logical product signal as the return-to-zero signal A2. The trigger flip-flop 502 inverts an output signal A3 for each one cycle of the return-to-zero signal A2. For example, a logical level of the output signal A3 is inverted for each one cycle of the return-to-zero signal A2, just like the high level→the low level→the high level. Specifically, the output signal A3 is logically inverted in synchronism with a rising edge of the return-to-zero signal A2. The short pulse generator 503 receives input of the output signal A3 of the trigger flip-flop 502 and the return-to-zero signal A2, and shortens the pulse width of the return-to-zero signal A2, and outputs the signal A6 that alternately produces a positive pulse and a negative pulse to the band-pass filter 103.

Figure 6:
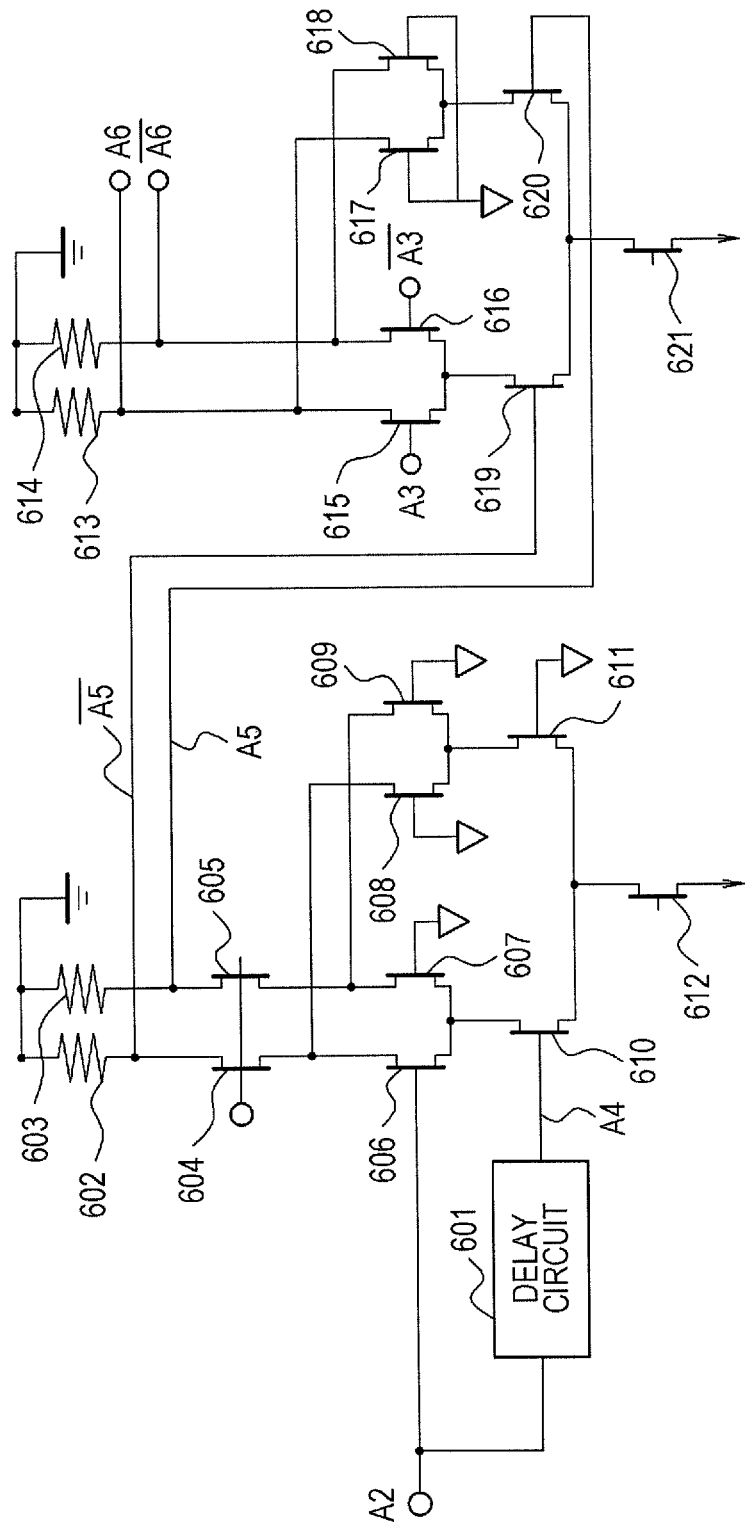
FIG. 6 is a circuit diagram illustrating an example of a configuration of the short pulse generator in FIG. 5.

FIG. 6 is a circuit diagram illustrating an example of a configuration of the short pulse generator 503 in FIG. 5. A delay circuit 601 outputs a signal A4, which is a delayed signal of the return-to-zero signal A2. A resistor 602 is connected between the ground potential node and a node of a signal /A5. A resistor 603 is connected between the ground potential node and a node of a signal A5. The signal A5 and the signal /A5 are differential signals whose phases are inverted with each other. A drain of an n-channel field-effect transistor 604 is connected to the node of the signal /A5, a gate thereof is connected to a bias potential node, and a source thereof is connected to a drain of an n-channel field-effect transistor 606. A drain of an n-channel field-effect transistor 605 is connected to a node of the signal A5, a gate thereof is connected to the bias potential node, and a source thereof is connected to a drain of an n-channel field-effect transistor 607. A gate of the n-channel field-effect transistor 606 is connected to a node of the return-to-zero signal A2, and a source thereof is connected to a drain of an n-channel field-effect transistor 610. A gate of the n-channel field-effect transistor 607 is connected to, for example, a potential node of −2 V, a source thereof is connected to the drain of the n-channel field-effect transistor 610. The transistor 604 and the transistor 605 constitute common-gate cascode amplifiers, respectively. A gate of the n-channel field-effect transistor 610 is connected the node of the signal A4, and a source thereof is connected to a drain of an n-channel field-effect transistor 612.

A drain of an n-channel field-effect transistor 608 is connected to a drain of the n-channel field-effect transistor 606, a gate thereof is connected to, for example, a potential node of −1.7 V, and a source thereof is connected to a drain of an n-channel field-effect transistor 611. A drain of an n-channel field-effect transistor 609 is connected to the drain of the n-channel field-effect transistor 607, a gate thereof is connected to, for example, a potential node of −2.3 V, and a source thereof is connected to a drain of the n-channel field-effect transistor 611. A gate of the n-channel field-effect transistor 611 is connected to, for example, a potential node of −2.4 V, a source thereof is connected to a drain of an n-channel field-effect transistor 612. The n-channel field-effect transistor 612 is a current source, a gate thereof is connected to a bias potential node, and a source thereof is connected to, for example, a potential node of −2.6 V.

A resistor 613 is connected between the ground potential node and a node of the signal A6. The resistor 614 is connected between the ground potential node and a node of the signal /A6. The signal A6 and the signal /A6 are differential signals whose phases are inverted with each other. A drain of an n-channel field-effect transistor 615 is connected to a node of the signal A6, a gate thereof is connected to a node of the signal A3, and a source thereof is connected to a drain of an n-channel field-effect transistor 619. A drain of an n-channel field-effect transistor 616 is connected to a node of the signal /A6, a gate thereof is connected to a node of signal /A3, and a source thereof is connected to a drain of the n-channel field-effect transistor 619. The signal A3 and the signal /A3 are differential signals whose phases are inverted with each other. A gate of the n-channel field-effect transistor 619 is connected to a node of the signal /A5, and a source thereof is connected to a drain of an n-channel field-effect transistor 621.

A drain of an n-channel field-effect transistor 617 is connected to a node of the signal A6, a gate thereof is connected to a bias potential node, and a source thereof is connected to a drain of an n-channel field-effect transistor 620. A drain of an n-channel field-effect transistor 618 is connected to a node of the signal /A6, a gate thereof is connected to a bias potential node, and a source thereof is connected to the drain of the n-channel field-effect transistor 620. A gate of the n-channel field-effect transistor 620 is connected to the node of the signal A5, a source thereof is connected to the drain of the n-channel field-effect transistor 621. The n-channel field-effect transistor 621 is a current source, a gate thereof is connected to a bias potential node, and a source thereof is connected to, for example, a potential node of −2.6 V.

The signal A5 is a logical product signal of the return-to-zero signal A2 and the delay signal A4. When the signal A3 is a high level, if the signal A5 becomes a high level pulse, the signal A6 becomes a positive pulse. On the other hand, when the signal A3 is a low level, if the signal A5 becomes a high level pulse, the signal A6 becomes a negative pulse. The bipolar short pulse A6 has, for example, a reference voltage of −0.4 V, and alternately produces a positive pulse of 0 V and a negative pulse of −0.8 V.

By the present embodiment, the transmission signal does not includes a bright line spectrum BL, and thus the transmission signal is not subject to a power limitation by the bright line spectrum BL. Accordingly, it is possible to ensure a large transmission power to obtain a high communication margin (S/N), and thereby there is an advantage in that it becomes easy to achieve long-distance and high-quality communication of the signal. Also, by suitably setting a communication speed for an allocated frequency band, and disposing notches at both ends of the allocated frequency band width, there is an advantage of reducing irradiation of unwanted power outside the allocated frequency band. In the reception unit, it is possible to configure the reception unit for receiving the bipolar short pulse A6 in the same manner as a reception unit for receiving the unipolar short pulse B6, and thus it is possible to suppress an increase in installation cost to a minimum.

In this regard, all of the above-described embodiment is only an example of implementing the present disclosure, and it is to be understood that a technical scope of the present disclosure be not limited by the description. That is to say, it is possible to carry out the present disclosure in various ways without departing from the spirit and scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication apparatus comprising:
a pulse generation unit configured to alternately generate a positive pulse and a negative pulse indicating presence of a data pulse in accordance with a logical value of a data signal, and generate a constant voltage signal, which have a certain constant voltage, indicating absence of the data pulse in accordance with a logical value of the data signal, wherein the positive pulse and the negative pulse generated by the pulse generation unit have a power spectrum density with notches arisen at frequencies equal to integer multiples of communication speed;
a band-pass filter configured to filter the positive pulse or the negative pulse generated by the pulse generation unit; and
a transmission amplifier configured to amplify a signal filtered by the band-pass filter, and to output the amplified signal as a transmission signal;
wherein the pulse generation unit includes a pulse generator configured to shorten a pulse width of a return-to-zero signal, and to alternately generate the positive pulse and the negative pulse;
wherein the pulse generation unit includes a trigger flip-flop configured to invert an output signal for each one cycle of the return-to-zero signal, and the pulse generator receives the output signal of the trigger flip-flop and the return-to-zero signal.

2. The communication apparatus according to claim 1, wherein the pulse generation unit includes a nonreturn-to-zero/return-to-zero conversion unit configured to convert the data signal from a nonreturn-to-zero signal to a return-to-zero signal.

3. A communication apparatus comprising:
a pulse generation unit configured to alternately generate a positive pulse and a negative pulse indicating presence or absence of a data pulse in accordance with a logical value of a data signal,
wherein the positive pulse and the negative pulse generated by the pulse generation unit have a power spectrum density with notches arisen at frequencies equal to integer multiples of communication speed;
a band-pass filter configured to filter the positive pulse or the negative pulse generated by the pulse generation unit; and
a transmission amplifier configured to amplify a signal filtered by the band-pass filter, and to output the amplified signal as a transmission signal,
wherein the pulse generation unit includes
a nonreturn-to-zero/return-to-zero conversion unit configured to convert the data signal from a nonreturn-to-zero signal to a return-to-zero signal, and
a pulse generator configured to shorten a pulse width of the return-to-zero signal, and to alternately generate the positive pulse and the negative pulse;
wherein the pulse generation unit includes a trigger flip-flop configured to invert an output signal for each one cycle of the return-to-zero signal, and the pulse generator receives the output signal of the trigger flip-flop and the return-to-zero signal.

4. A communication apparatus comprising:
a pulse generation unit configured to alternately generate a positive pulse and a negative pulse indicating presence or absence of a data pulse in accordance with a logical value of a data signal,
wherein the positive pulse and the negative pulse generated by the pulse generation unit have a power spectrum density with notches at frequencies equal to integer multiples of communication speed;
a band-pass filter configured to filter the positive pulse or the negative pulse generated by the pulse generation unit; and
a transmission amplifier configured to amplify a signal filtered by the band-pass filter, and to output the amplified signal as a transmission signal,
wherein a transmission speed of the data signal is one of integer divisions of a difference between an upper-limit pass frequency and a lower-limit pass frequency of the band-pass filter;
wherein the pulse generation unit includes a pulse generator configured to shorten a pulse width of a return-to-zero signal, and to alternately generate the positive pulse and the negative pulse;
wherein the pulse generation unit includes a trigger flip-flop configured to invert an output signal for each one cycle of the return-to-zero signal, and the pulse generator receives the output signal of the trigger flip-flop and the return-to-zero signal.

5. The communication apparatus according to claim 1, further comprising
a first antenna for radio-transmitting the transmission signal amplified by the transmission amplifier.

6. The communication apparatus according to claim 1, further comprising
a reception amplifier configured to amplify a reception signal, and
a wave detector configured to detect the reception signal amplified by the reception amplifier.

7. The communication apparatus according to claim 6, further comprising
a second antenna for radio receiving the reception signal, wherein the reception amplifier amplifies the reception signal radio-received by the second antenna.

8. A communication apparatus comprising:

a pulse generation unit configured to alternately generate a positive pulse and a negative pulse indicating presence of a data pulse in accordance with a logical value of a data signal, and generate a constant voltage signal, which have a certain constant voltage, indicating absence of the data pulse in accordance with a logical value of the data signal, wherein the positive pulse and the negative pulse generated by the pulse generation unit have a power spectrum density with notches arisen at frequencies equal to integer multiples of communication speed;

a band-pass filter configured to filter the positive pulse or the negative pulse generated by the pulse generation unit; and a transmission amplifier configured to amplify a signal filtered by the band-pass filter, and to output the amplified signal as a transmission signal, wherein, in a signal output from the band-pass filter, bright line spectra having frequencies equal to the integer multiples of the communication speed are removed, wherein the communication speed of the data signal is set to integer divisions of a difference between upper-limit pass frequency of the bandpass filter and lower-limit pass frequency of the band-pass filter;

wherein the pulse generation unit includes a pulse generator configured to shorten a pulse width of a return-to-zero signal, and to alternately generate the positive pulse and the negative pulse;

wherein the pulse generation unit includes a trigger flip-flop configured to invert an output signal for each one cycle of the return-to-zero signal, and the pulse generator receives the output signal of the trigger flip-flop and the return-to-zero signal.

9. A communication apparatus comprising:

a pulse generation unit configured to alternately generate a positive pulse and a negative pulse indicating presence or absence of a data pulse in accordance with a logical value of a data signal, wherein the positive pulse and the negative pulse generated by the pulse generation unit have a power spectrum density with notches arisen at frequencies equal to integer multiples of communication speed;

a band-pass filter configured to filter the positive pulse or the negative pulse generated by the pulse generation unit; and a transmission amplifier configured to amplify a signal filtered by the band-pass filter, and to output the amplified signal as a transmission signal, wherein the pulse generation unit includes a nonreturn-to-zero/return-to-zero conversion unit configured to convert the data signal from a nonreturn-to-zero signal to a return-to-zero signal, and a pulse generator configured to shorten a pulse width of the return-to-zero signal, and to alternately generate the positive pulse and the negative pulse, wherein, in a signal output from the band-pass filter, bright line spectra having frequencies equal to the integer multiples of the communication speed are removed, wherein the communication speed of the data signal is set to integer divisions of a difference between upper-limit pass frequency of the bandpass filter and lower-limit pass frequency of the band-pass filter;

wherein the pulse generation unit includes a trigger flip-flop configured to invert an output signal for each one cycle of the return-to-zero signal, and the pulse generator receives the output signal of the trigger flip-flop and the return-to-zero signal.

10. A communication apparatus comprising:

a pulse generation unit configured to alternately generate a positive pulse and a negative pulse indicating presence or absence of a data pulse in accordance with a logical value of a data signal, wherein the positive pulse and the negative pulse generated by the pulse generation unit have a power spectrum density with notches at frequencies equal to integer multiples of communication speed;

a band-pass filter configured to filter the positive pulse or the negative pulse generated by the pulse generation unit; and a transmission amplifier configured to amplify a signal filtered by the band-pass filter, and to output the amplified signal as a transmission signal, wherein a transmission speed of the data signal is one of integer divisions of a difference between an upper-limit pass frequency and a lower-limit pass frequency of the band-pass filter, wherein, in a signal output from the band-pass filter, bright line spectra having frequencies equal to the integer multiples of the communication speed are removed;

wherein the pulse generation unit includes a pulse generator configured to shorten a pulse width of a return-to-zero signal, and to alternately generate the positive pulse and the negative pulse;

wherein the pulse generation unit includes a trigger flip-flop configured to invert an output signal for each one cycle of the return-to-zero signal, and the pulse generator receives the output signal of the trigger flip-flop and the return-to-zero signal.

* * * * *